(12) United States Patent
Chu

(10) Patent No.: US 8,094,383 B2
(45) Date of Patent: Jan. 10, 2012

(54) OPTICAL IMAGING LENS

(75) Inventor: Chia-Wen Chu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/081,117

(22) Filed: Apr. 10, 2008

(65) Prior Publication Data

US 2011/0080656 A1  Apr. 7, 2011

(51) Int. Cl.
  *G02B 13/18* (2006.01)
  *G02B 9/14* (2006.01)
  *G02B 9/00* (2006.01)
(52) U.S. Cl. ............... 359/716; 359/740; 359/785
(58) Field of Classification Search ............ 359/716, 359/713–715, 785
  See application file for complete search history.

(56) References Cited

U.S. PATENT DOCUMENTS

| 6,795,253 | B2 * | 9/2004 | Shinohara | 359/716 |
| 7,508,601 | B2 * | 3/2009 | Murakami et al. | 359/791 |
| 7,675,692 | B2 * | 3/2010 | Do | 359/716 |
| 7,710,662 | B2 * | 5/2010 | Nakanishi | 359/716 |
| 2007/0229981 | A1 * | 10/2007 | Sato et al. | 359/716 |

* cited by examiner

*Primary Examiner* — Jordan Schwartz

(74) *Attorney, Agent, or Firm* — Muncy, Geissler, Olds & Lowe, PLLC

(57) ABSTRACT

An optical imaging lens, from object side to image side, includes a positive first lens element that is a meniscus aspherical lens having a convex surface on the object side, an aperture stop, a negative second lens element that is a meniscus aspherical lens having a convex surface on the image side, a positive third lens element that is an aspherical lens while on the lens center, the convex surface is on the object side; and from the center toward the edge, the refractive power changes from positive power, through an inflection point, to negative power. The optical imaging lens satisfies specific mathematical conditions.

12 Claims, 6 Drawing Sheets

OPTICAL IMAGING LENS

BACKGROUND OF THE INVENTION

The present invention relates to an optical imaging lens, and more particularly to an optical imaging lens for mobile phones or image sensors such as CCD (Charge Coupled Device) or CMOS (Complementary Metal Oxide Semiconductor) formed by three elements of lens with features of high performance, minimized total length and low cost.

Due to fast development of modern technology, electronics have becoming more compact and multifunctional. A lot of electronics such as digital cameras, PC (personal computer) cameras, network cameras, mobile phones, even personal digital assistants are equipped with image capturing devices. For convenience of easy-carrying and requirement of humanization, the image capturing devices requires good image quality, compact volume and low cost. Especially for applications on mobile phones, the above requirements are getting more important.

Due to many materials available for making the lens and better correcting effect for color aberration, conventional spherical ground glass lenses have been widely adopted in optical industry field. However, the spherical ground glass lenses have poor effect on correction of spherical aberration and astigmatic aberration when being applied under condition of a smaller f number and wide angle of field. In order to improve above disadvantages of the conventional spherical ground glass lenses, the image capturing devices available now use aspherical plastic lenses or aspherical molded glass lenses to replace conventional spherical ground glass lenses for better imaging quality. For example, refer to the lenses disclosed the optical imaging lens are formed by three lens elements, such as US2007/0091457, U.S. Pat. No. 6,515,809, U.S. Pat. No. 7,262,925, US 2007/0195432, US2005/0128334, JP 2007-121820, JP2005-352317, JP 2004-163786, JP 2007-094113, JP 2005-338234, JP 2007-047513, and JP 2006-098976 etc. The differences among embodiments of above patents are in components or combinations of components. For example, the three lens elements are all in meniscus shape or the first and the second lens elements are meniscus while the third lens element is in plano-concave shape or plano-convex shape. Or the convex surface/concave surface of the first/second/third lens elements can be arranged on the object/image side. Or the refractive power of the three lens elements may vary. For example, refractive power of the first, the second and the third lens elements are respectively positive, negative, positive or positive, positive, negative in sequence. Moreover, the three lens set/lens element respectively satisfy various optical parameters such as f (effective focal length of the whole optical imaging lens), d (distance between the object side and the image side of the first lens element), $R_{11}$ (radius of curvature of the object side of the first lens element), $R_{12}$ (radius of curvature of the image side of the first lens element), $f_1$ (effective focal length of the first lens element), $f_2$ (effective focal length of the second lens element), and $f_3$ (effective focal length of the third lens element), as the embodiment shown in Japanese patent No. 3717488. Thus it is learned that the design of a three-element type optical imaging lens depends on optical requirements that result from combinations of various lens in different shapes and with different functions.

In recent years, the optical imaging lens are getting more compact with shorter focal length and better aberration correction for being applied to various portable electronics such as cameras, camera phones, and PDA. In different designs of compact three-element type optical imaging lens, the lens having a first lens element with positive refractive power, a second lens element with negative refractive power, a third lens element with an inflection point that changes the refractive power achieves most compact requirement, as lenses disclosed in U.S. Pat. No. 7,145,736, US2007/0070527, US2007/0091468, US2007/0070510, US2007/0146903, US2006/0061882, US2004/0190162, US2005/0270665, US2006/0152824, JP2005-345713, JP2005-189735, JP2006-098976, WO2006077663, WO2007039980, JP2006-047858, JP2006-178328, TW255361, TW200639432, CN1670560, CN1873460, and so on. For more compact size and better aberration-correction effect, the present invention provides a lens that can be applied to mobile phones more easily.

SUMMARY OF THE INVENTION

Therefore it is a primary object of the present invention to provide an optical imaging lens. From the object side to the image side, along an optical axis, the first lens element with positive refractive power that is a meniscus aspherical lens having a convex surface on the object side, an aperture stop, a second lens element with negative refractive power that is a meniscus aspherical lens having a convex surface on the image side, a third lens element with positive refractive power that is an aspherical lens whose center is on the optical axis while on the lens center, the convex surface is on the object side and the concave surface is on the image side. Moreover, from the center of the third lens element toward the edge, the refractive power changes from positive power, through an inflection point, to negative power. The optical imaging lens satisfies following conditions:

$$0.5 < \frac{f_1}{f} < 1.0 \quad (1)$$

$$-0.3 < \frac{f_2}{f} < -1.0 \quad (2)$$

$$0.05 < \frac{d_3}{f} < 0.2 \quad (3)$$

$$\left|\frac{R_{21} - R_{22}}{R_{21} + R_{22}}\right| < 0.15 \quad (4)$$

$$\frac{H_+}{H_t} \geq 0.5 \quad (5)$$

$$N_{d1} \geq 1.5 \quad (6)$$

$$v_{d1} \geq 55 \quad (7)$$

$$v_{d2} \cdot N_{d2} \geq 29.5 \quad (8)$$

$$N_{d3} \geq 1.4 \quad (9)$$

$$v_{d3} \geq 42 \quad (10)$$

wherein f is effective focal length of the optical imaging lens, $f_1$ is effective focal length of the first lens element, $f_2$ is effective focal length of the second lens element, $d_3$ is distance from the image side 12 of the first lens element L1 to the object side of the second lens element, $R_{21}$ is radius of curvature of the object side of the second lens element and $R_{22}$ is radius of curvature of the image side of the second lens element, $H_+$ is the distance from the inflection point of the third lens element to the optical axis, $H_t$ is the distance from the maximum optical effective point of the third lens element to the optical axis, $N_{d1}$ is the refractive index of the first lens element, $v_{d1}$ is the abbe number of the first lens element, $N_{d2}$ is the refractive index of the second lens element, $v_{d2}$ is the abbe number of the second lens element, $N_{d3}$ is the refractive index of the third lens element, $v_{d3}$ is the abbe number of the third lens element.

Thereby, the imaging lens of the present invention achieves effective aberration correction, high resolution and minimum length. Therefore, the imaging lens with smaller volume, lower cost has broader applications.

DETAILED DESCRIPTION OF THE PREFERRED EMBODIMENT

Figure 1:
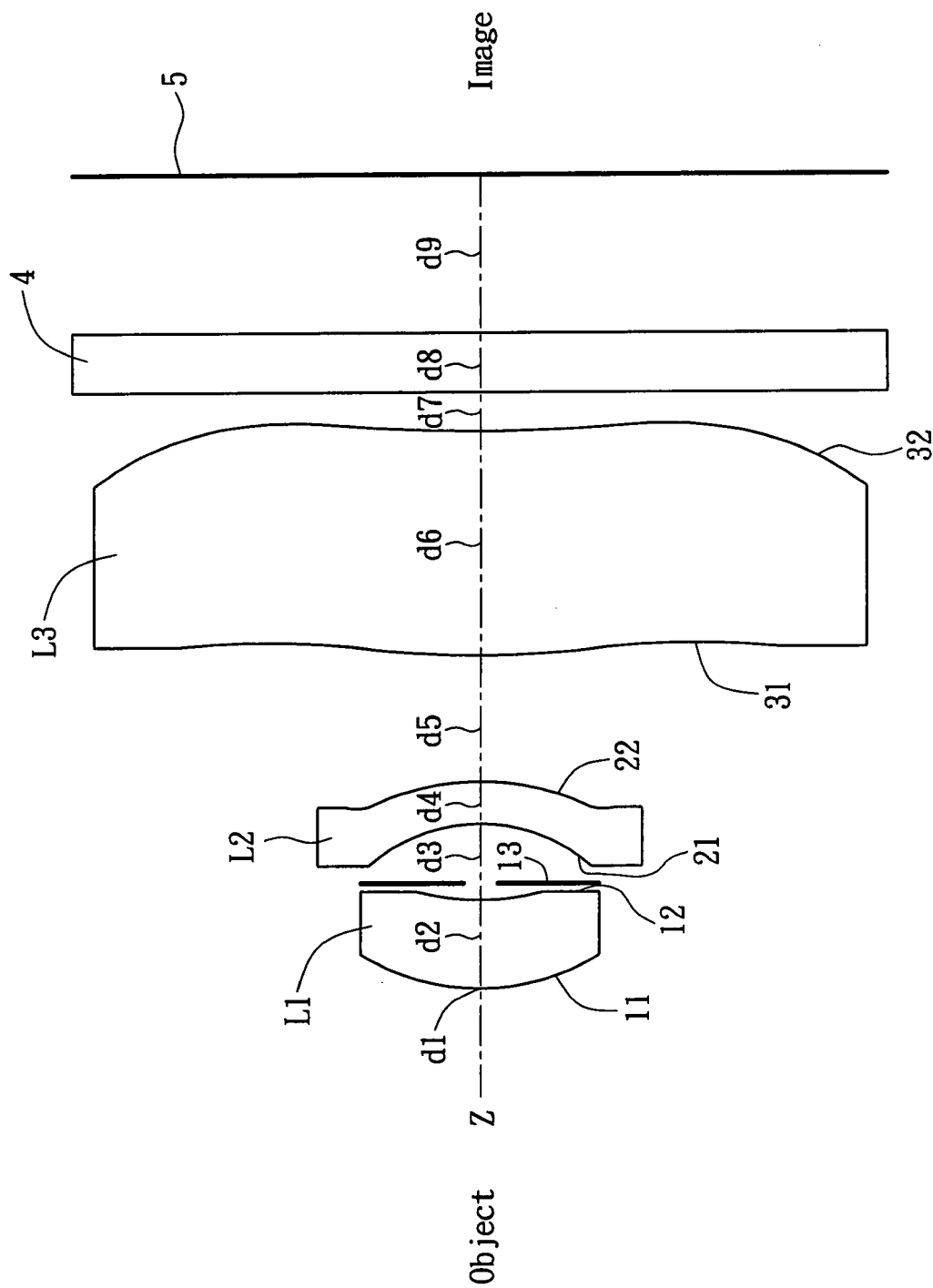
FIG. 1 is a schematic drawing of an optical structure of an embodiment according to the present invention.

Refer to FIG. 1, a three-element type optical imaging lens of the present invention includes a first lens element L1, an aperture stop 13, a second lens element L2, a third lens element L3, an IR(infrared) cut-off filter 5 and an image sensor 5 along the optical axis Z, in order from the object side to the image side. While capturing image, light from the object passes the first lens element L1, the second lens element L2, the third lens element L3 and the IR cut-off filter 4, then an image is formed on the image sensor 5

The first lens element L1 with positive refractive power is a meniscus aspherical lens whose object side 11 (the side facing the object) is a convex surface and an image side 12 (the side facing the image) thereof is a concave surface while at least one of the object side (convex surface) 11 and the image side (concave surface) 12 is an aspherical surface or both sides 11, 12 are aspherical. The first lens element L1 is made from glass or plastic whose refractive index $N_{d1}$ is larger than 1.5 and the abbe number $v_{d1}$ is larger than 55.

The second lens element L2 with negative refractive power is a meniscus aspherical lens made from glass or plastic whose refractive index $N_{d2}$ is larger than 1.56 and the abbe number $v_{d2}$ is larger than 19, or the product of the refractive index $N_{d2}$ and the abbe number $v_{d2}$ is larger than 29.5. The second lens element L2 includes an object side 21 (the side facing the object) that is a concave surface and an image side 22 (the side facing the image) thereof is a convex surface while at least one of the concave surface 21 and the convex surface 22 is an aspherical surface or both sides 21, 22 are aspherical.

The third lens element L3 is an aspherical lens with positive or negative refractive power and is made from glass or plastic whose $N_{d3}$ is larger than 1.4 and the abbe number $v_{d2}$ is larger than 42. An object side 31 of the third lens element L3 is a convex surface while an image side 32 thereof is a concave surface. From a center of the lens L3 toward the edge, the refractive power changes from positive to negative, through an inflection point.

As shown in FIG. 1, a cross section of the third lens element L3 shows that the center is concave while the neighboring of center is concave, so called as M-shape. On the wavelike image side 32 and the object side 31, the curvature changes from a concave/convex surface of the lens center to the convex/concave surface of the lens peripheral and the inflection point forms between the conversion of the refractive power. When a tangent line passes through the inflection point and crosses the optical axis vertically, the distance from the inflection point to the optical axis is the height of the lens with positive refractive power and is labeled $H_+$. That's the distance from the inflection point of the third lens element L3 to the optical axis Z. The distance from the maximum optical effective point of the third lens element L3 to the optical axis Z is labeled as $H_r$. The ratio of $H_+$ to $H_r$ represents the area changing from positive refractive power to negative refractive power. In order to have better image, the preferred ratio is larger than the 50%, the equation (5).

The IR cut-off filter 4 is a lens processed by coating technology for filtering infrared light. The image sensor 5 is a CCD (Charge Coupled Device) or CMOS (Complementary Metal Oxide Semiconductor). The aperture stop 13 is arranged between the first lens element L1 and the second lens element L2, a shown in FIG. 1, or is against on the image side (concave surface) 12 of the first lens element L1. While capturing images, light from the object firstly passes the first lens element L1, the second lens element L2, the third lens element L3, and the IR cut-off filter 4 to form an image on the image sensor 5. The three elements type optical imaging lens of the present invention satisfies following equations (1) to (4):

$$0.5 < \frac{f_1}{f} < 1.0; \tag{1}$$

$$-0.3 < \frac{f_2}{f} < -1.0; \tag{2}$$

$$0.05 < \frac{d_3}{f} < 0.2; \tag{3}$$

$$\left|\frac{R_{21} - R_{22}}{R_{21} + R_{22}}\right| < 0.15; \tag{4}$$

thereby the total length of the lens is effectively minimized and applications of the lens are improved.

Moreover, in order to increase design tolerance, the first lens element L1, the second lens element L2, or the third lens element L3 can be further designed to be with one aspherical surface or two aspherical surfaces while the Aspherical Surface Formula is as equation (11):

$$Z = \frac{ch^2}{1+\sqrt{(1-(1+K)c^2h^2)}} + A_4h^4 + A_6h^6 + A_8h^8 + A_{10}h^{10} + A_{12}h^{12} + A_{14}h^{14} \tag{11}$$

wherein c is a radius of curvature,
h represents height of lens,
K is a conic constant,
$A_4, A_6, A_8, A_{10}, A_{12}, A_{14}$ respectively are 4th, 6th, 8th, 10th, 12th, 14th order aspherical coefficient.

The first lens element L1, the second lens element L2, and the third lens element L3 can made from glass or plastic. There are many ways of combinations, for example, the first lens element L1 and the third lens element L3 are made from glass while the second lens element L2 is made from plastic; the first lens element L1 is made from glass while the second lens element L2 and the third lens element L3 are made from plastic; the first lens element L1, the second lens element L2 and the third lens element L3 are all glass; the first lens element L1 and the third lens element L3 are made from plastic while the second lens element L2 is glass; the first lens element L1 and the second lens element L2 are made from plastic while the third lens element L3 is glass; or the first lens element L1, the second lens element L2 and the third lens element L3 are all made from plastic. The refractive index and the abbe number of each lens element respectively satisfy the equation (6) to equation (10) according to the design.

In accordance with above structure, the aberration is effectively corrected and the main injection light angle is reduced so that the lens has high resolution and minimized length. Once the glass is selected to produce the lens, aspherical glass lens manufacturing technology, as press molding technology, is used to reduce manufacturing difficulty of the lens and make the imaging lens with compact volume and lower cost so as to improve the applications of the lens.

The First Embodiment

Refer from FIG. 1 and is showing this embodiment. In order from the object side to the image side, the optical surface numbers, the radius of curvature R (mm) of each optical surface on the optical axis, the on-axis surface spacing d (mm) of each optical surface on the optical axis, the refractive index $N_d$ of each lens, and the Abbe's number $v_d$ of each lens is listing in Table 1.

TABLE 1

Fno = 2.8 f = 3.3957 FOV = 66.7

| Surf. No. | R | d | $N_d$ | $v_d$ |
|---|---|---|---|---|
| OBJ | ∞ | | | |
| 1 | ∞ | 0 | | |
| 2* | 1.138207 | 0.4757533 | 1.587546 | 62.669992 |
| STOP* | 4.635663 | 0.333256 | | |
| 4* | −0.6564853 | 0.2064599 | 1.650617 | 25.945454 |
| 5* | −0.8782481 | 0.6443426 | | |
| 6* | 4.633077 | 1.087018 | 1.527791 | 43.92713 |
| 7* | 6.054967 | 0.08495823 | | |
| 8 | ∞ | 0.3 | BSC7 | 3.470239 |
| 9 | ∞ | 0.8849003 | | |
| 10 | ∞ | | | |
| IMAGE | ∞ | | | |

In the table 1, the optical surfaces labeled with mark* are aspherical surface. Surf 2, Surf STOP respectively represent the object side 11 and the image side 12 of the first lens element L1, Surf 4, Surf 5 respectively represent the object side 21 and the image side 22 of the second lens element L2, while Surf 6 and Surf 7 respectively represent the object side 31 and the image side 32 of the third lens element L3; Fno is f number of the imaging lens in this embodiment; f is a focal length of the imaging lens; FOV is the field of view. The aspheric coefficients of each optical surface are listing in Table 2.

TABLE 2

| Surf | A4 | A6 | A8 | A10 | A12 | A14 |
|---|---|---|---|---|---|---|
| 2 | 1.24671E−01 | −2.54065E−01 | 1.39189E+00 | −2.98986E+00 | 6.64572E−01 | 0 |
| STOP | −3.09563E−01 | 1.65360E+00 | −1.52875E+01 | 5.51356E+01 | −8.14409E+01 | 0 |
| 4 | 5.12507E−01 | 4.30166E−02 | 4.86114E+00 | −2.36413E+00 | 1.77360E+01 | −8.73691E+01 |
| 5 | 3.41175E−01 | 4.79652E−02 | 3.64609E+00 | −5.18870E+00 | 5.17641E−01 | 0 |
| 6 | −3.37035E−02 | −1.86136E−02 | 1.68891E−02 | −4.53661E−03 | 1.14962E−04 | 1.10434E−04 |
| 7 | −5.23888E−02 | −1.13667E−02 | 7.60650E−03 | −2.99570E−03 | 8.22865E−04 | −9.99644E−05 |

In this embodiment, the first lens element L1 is made from glass that has the refractive index $N_{d1}$ of 1.59, and the Abbe's number $v_{d1}$ of 62.67, the second lens element L2 is made from plastic that has the refractive index $N_{d2}$ of 1.65 and the Abbe's number $v_{d2}$ of 25.95, and the third lens element L3 is made from glass that has the refractive index $N_{d3}$ of 1.53 and the Abbe's number $v_{d3}$ of 43.93 while the IR cut-off filter 4 is made from BSC7 glass.

The systematic effective focal length f of this embodiment is 3.957 mm while the focal length $f_1$ of the first lens element L1 is 2.44 mm, and the focal length $f_2$ of the second lens element L2 is −6.31 mm. The distance $d_3$ from the image side 12 of the first lens element L1 to the object side of the second lens element L2 is 0.333 mm. The curvature radius of each optical surface of the second lens element L2 is −0.6564, −0.8782 mm respectively. That means the above parameters satisfy the following equation (1) to equation (5):

$$\frac{f_1}{f} = 0.6166; \quad \frac{f_2}{f} = -1.5946; \quad \frac{d_3}{f} = 0.0842;$$

$$\left|\frac{R_{21} - R_{22}}{R_{21} + R_{22}}\right| = 0.1445; \quad \frac{H_+}{H_t} = 0.54;$$

Figure 3:
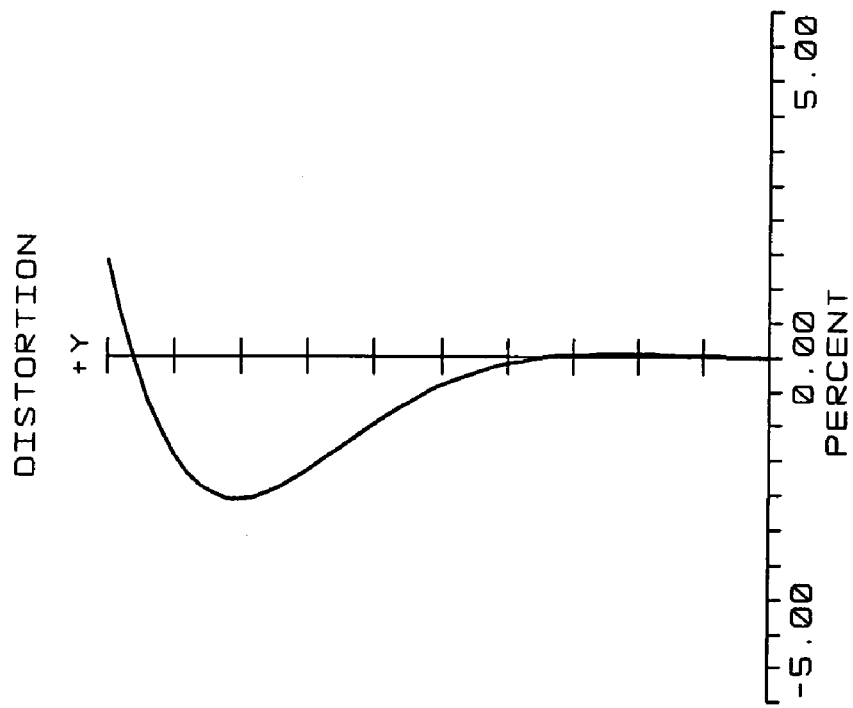
FIG. 3 shows distortion of an image of an embodiment according to the present invention.
Figure 2:
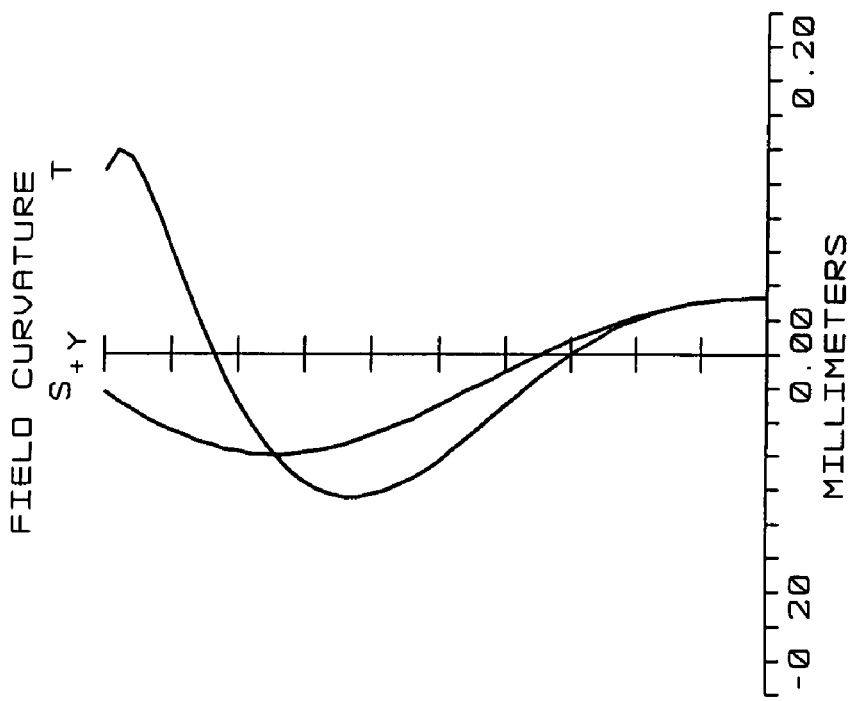
FIG. 2 shows field curvature of an image of an embodiment according to the present invention.

The total length of the imaging lens according to the present invention is only 4.02 mm. Refer to FIGS. 2 and 3, the imaging lens of the present invention achieves effective aberration correction, high resolution and minimum length. Therefore, the present invention has smaller volume, lower cost and broader applications.

The Second Embodiment

Figure 4:
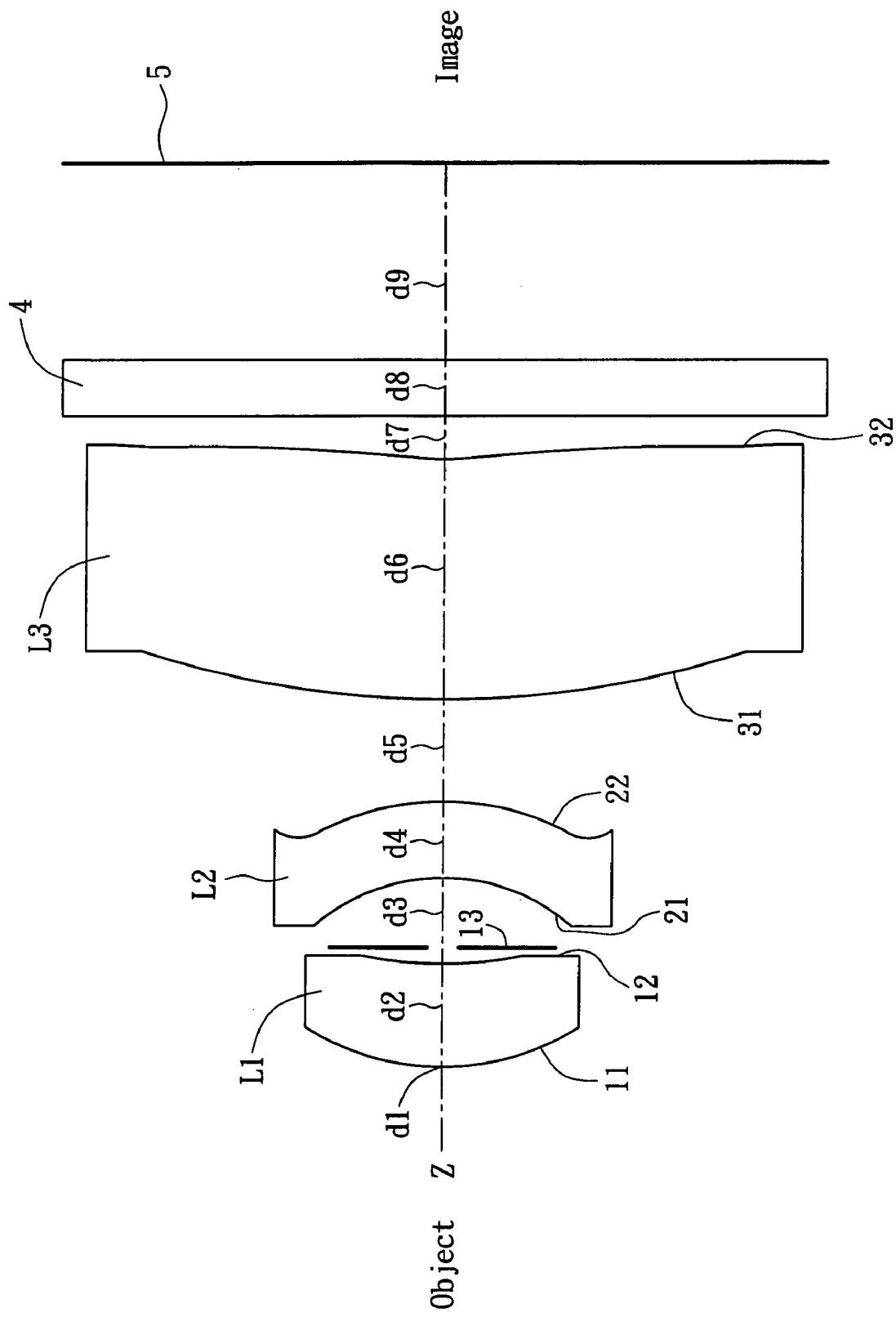
FIG. 4 is a schematic drawing of an optical structure of another embodiment according to the present invention.
Figure 6:
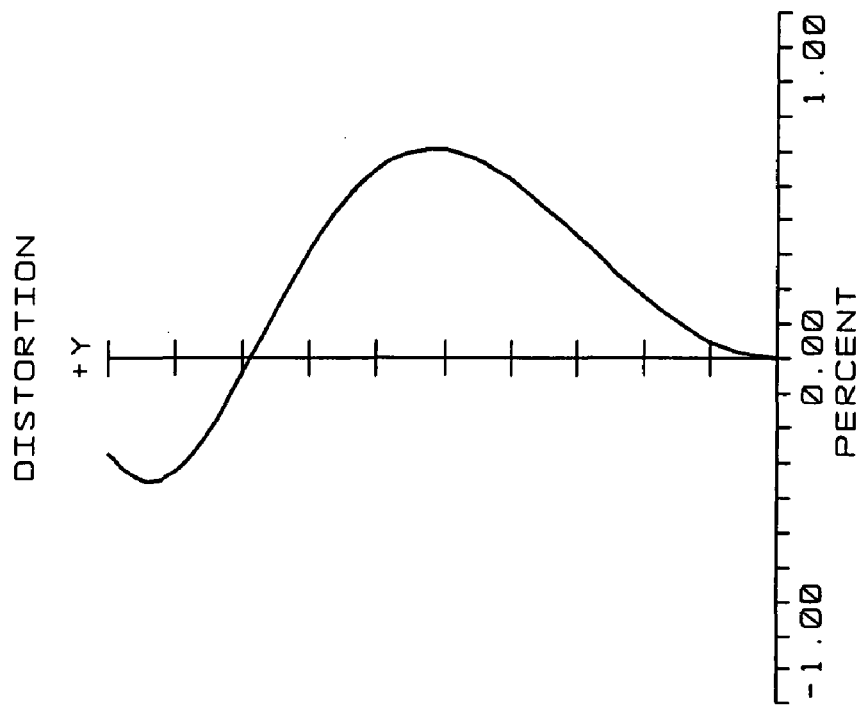
FIG. 6 shows distortion of an image of an embodiment in FIG. 4 according to the present invention.
Figure 5:
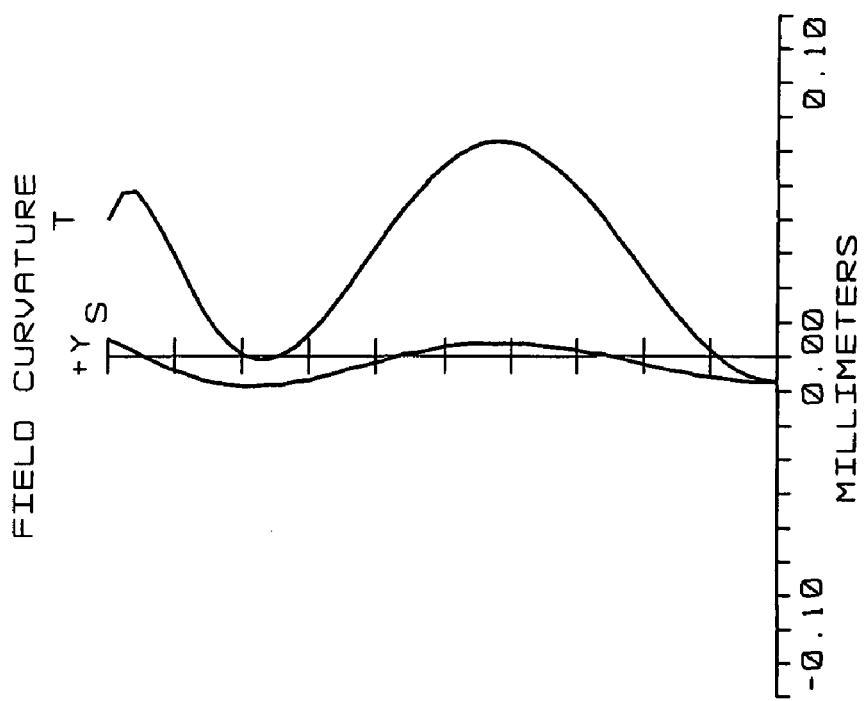
FIG. 5 shows field curvature of an image of the embodiment in FIG. 4 according to the present invention.

Refer from FIG. 4 to FIG. 6, Table 3 and Table 4, the symbols thereof are the same as those of the above embodiment.

TABLE 3

Fno = 2.8 f = 3.7932 FOV = 61

| Surf | R | d | $N_d$ | $v_d$ |
|---|---|---|---|---|
| OBJ | ∞ | 0 | | |
| 1 | 1.382276 | 0.575324 | 1.592304 | 57.007738 |
| 2* | 6.288722 | 0.4101307 | | |

TABLE 3-continued

Fno = 2.8 f = 3.7932 FOV = 61

| Surf | R | d | $N_d$ | $v_d$ |
|---|---|---|---|---|
| STOP* | −0.8048538 | 0.3752453 | 1.699029 | 19.756057 |
| 4* | −1.073326 | 0.5573871 | | |
| 5* | 5.672397 | 1.285207 | 1.522044 | 66.935428 |
| 6* | 7.088676 | 0.1542707 | | |
| 7* | ∞ | 0.3 | BSC7 | |
| 8 | ∞ | 1.131951 | | |
| 9 | ∞ | 0 | | |
| 10 | ∞ | | | |
| IMAGE | ∞ | | | |

TABLE 4

| Surf | A4 | A6 | A8 | A10 | A12 | A14 |
|---|---|---|---|---|---|---|
| 2 | 6.13372E−02 | −1.03515E−01 | 3.27534E−01 | −5.01499E−01 | 9.30768E−02 | 0 |
| STOP | −1.71287E−01 | 5.88224E−01 | −3.78531E+00 | 9.03207E+00 | −8.92019E+00 | 0 |
| 4 | 2.72501E−01 | 1.80280E−02 | 1.19260E+00 | −4.46266E+00 | 1.61425E+00 | −7.79459E+00 |
| 5 | 1.85452E−01 | −3.40114E−02 | 8.01326E−01 | −9.02915E−01 | 3.98681E−01 | 0 |
| 6 | −6.75944E−03 | −3.35333E−03 | 4.78209E−03 | −6.28654E−04 | −5.14523E−06 | −6.45672E−05 |
| 7 | −2.32513E−02 | −3.89653E−03 | 2.35579E−03 | −3.67802E−04 | 1.01598E−04 | −1.74774E−05 |

In this embodiment, the first lens element L1 is made from glass that has the refractive index $N_{d1}$ of 1.59, and the Abbe's number $v_{d1}$ of 57.00, the second lens element L2 is made from glass that has the refractive index $N_{d2}$ of 1.699 and the Abbe's number $v_{d2}$ of 19.756, and the third lens element L3 is made from glass that has the refractive index $N_{d3}$ of 1.522 and the Abbe's number $v_{d3}$ of 66.935 while the IR cut-off filter 4 is made from BSC7 glass.

The effective focal length f of the lens of this embodiment is 3.793 mm while the focal length $f_1$ of the first lens element L1 is 2.86 mm, and the focal length $f_2$ of the second lens element L2 is −10.83 mm. The distance $d_3$ from the image side 12 of the first lens element L1 to the object side of the second lens element L2 is 0.410 mm. The curvature radius of each optical surface of the second lens element L2 is −0.8048, −1.0733 mm respectively. That means these parameters satisfy the following equation (1) to equation (5):

$$\frac{f_1}{f} = 0.754; \quad \frac{f_2}{f} = -2.855; \quad \frac{d_3}{f} = 0.108;$$

$$\left|\frac{R_{21} - R_{22}}{R_{21} + R_{22}}\right| = 0.1429; \quad \frac{H_+}{H_t} = 0.90;$$

The total length of the imaging lens in this embodiment is 4.79 mm.

The Third Embodiment

Figure 7:
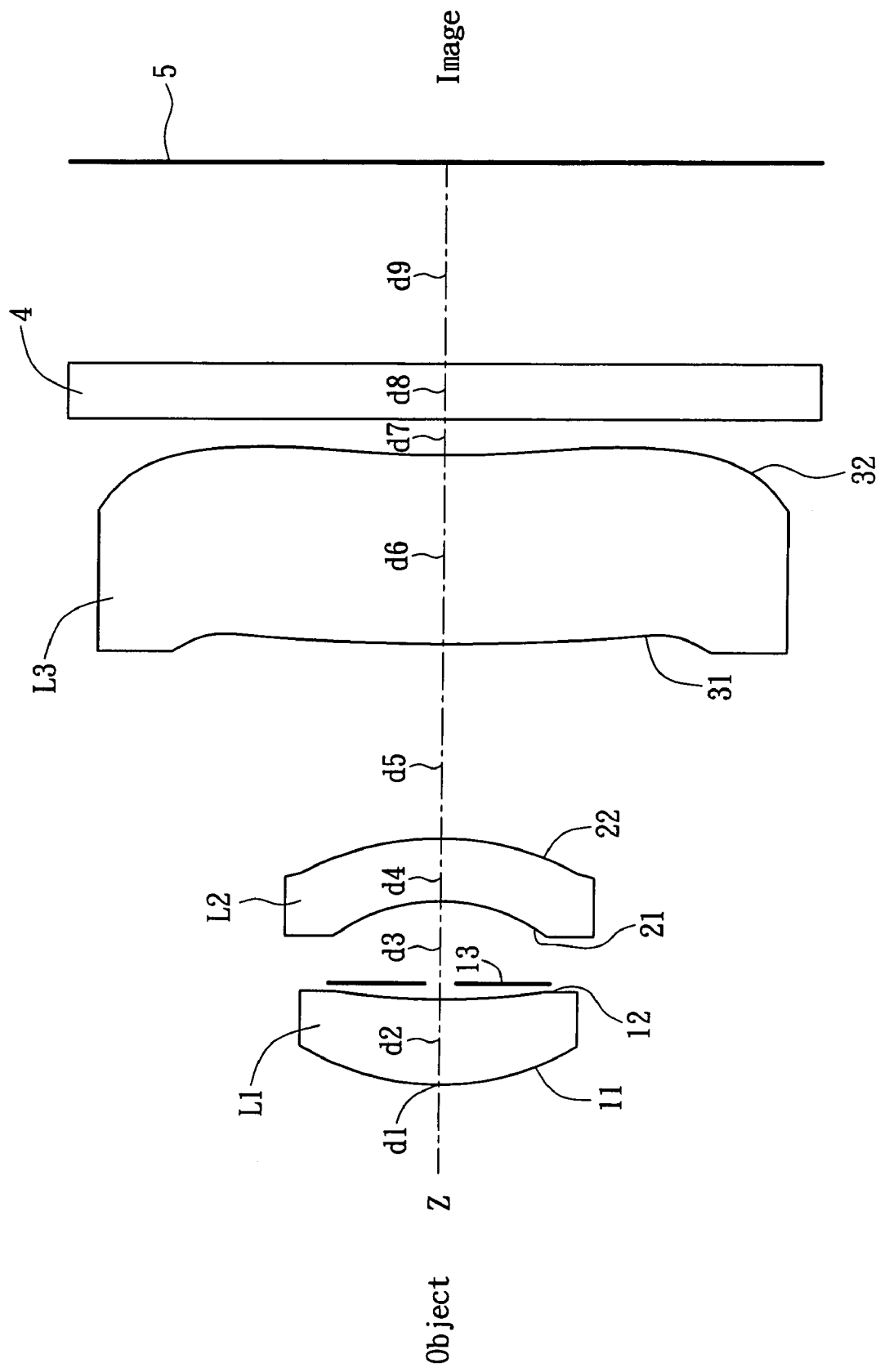
FIG. 7 is a schematic drawing of an optical structure of a further embodiment according to the present invention.
Figures 8, 9:
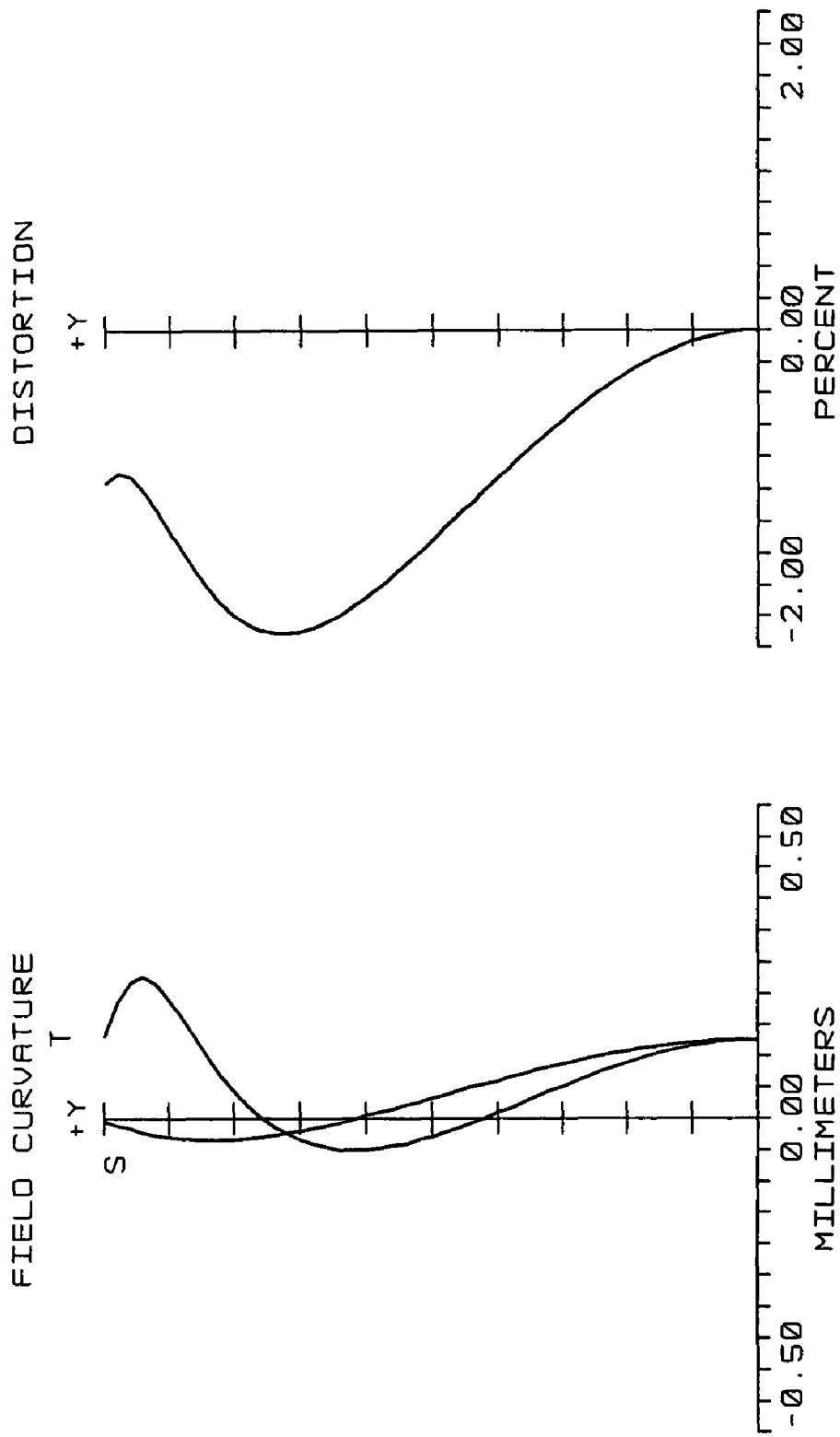
FIG. 8 shows field curvature of an image of the embodiment in FIG. 7 according to the present invention.
FIG. 9 shows distortion of an image of an embodiment in FIG. 7 according to the present invention.

Refer from FIG. 7 to FIG. 9, Table 5 and Table 6, the symbols thereof are the same as those of the first embodiment.

TABLE 5

Fno = 2.8 f = 4.3080 FOV = 54.8

| Surf | R | d | $N_d$ | $v_d$ |
|---|---|---|---|---|
| OBJ | ∞ | 600 | | |
| 1 | ∞ | 0 | | |
| 2* | 1.398981 | 0.4642461 | 1.586337 | 62.338086 |
| STOP* | 5.62809 | 0.4834988 | | |
| 4* | −0.8028469 | 0.3200523 | 1.573931 | 22.786742 |
| 5* | −1.075538 | 1.038355 | | |
| 6* | 6.074116 | 1.013384 | 1.421629 | 79.792993 |
| 7* | 6.591773 | 0.1132827 | | |
| 8 | ∞ | 0.3 | BSC7 | |
| 9 | ∞ | 1.098914 | | |

TABLE 5-continued

Fno = 2.8 f = 4.3080 FOV = 54.8

| Surf | R | d | $N_d$ | $v_d$ |
|---|---|---|---|---|
| 10 | ∞ | | | |
| IMAGE | ∞ | | | |

TABLE 6

| Surf | A4 | A6 | A8 | A10 | A12 | A14 |
|---|---|---|---|---|---|---|
| 2 | 6.09451E−02 | −8.73854E−02 | 3.70870E−01 | −4.47208E−01 | 5.36996E−02 | 0 |
| STOP | −1.50649E−01 | 6.23299E−01 | −3.72826E+00 | 9.11467E+00 | −8.83643E+00 | 0 |
| 4 | 2.73017E−01 | −1.88753E−02 | 1.09131E+00 | −5.31805E−01 | 2.11124E+00 | −4.82588E+00 |
| 5 | 1.62898E−01 | −2.57261E−02 | 8.51840E−01 | −8.48133E−01 | 1.72359E−01 | 0 |
| 6 | −2.05279E−02 | −8.27907E−03 | 3.09017E−03 | −1.52384E−03 | −4.45357E−04 | −2.75600E−04 |
| 7 | −2.58883E−02 | −3.50832E−03 | 2.10350E−03 | −4.76701E−04 | 6.89019E−05 | −5.20245E−05 |

In this embodiment, the first lens element L1 is made from glass that has the refractive index $N_{d1}$ of 1.586, and the Abbe's number $v_{d1}$ of 62.338, the second lens element L2 is made from plastic that has the refractive index $N_{d2}$ of 1.573 and the Abbe's number $v_{d2}$ of 22.787, and the third lens element L3 is made from plastic that has the refractive index $N_{d3}$ of 1.421 and the Abbe's number $v_{d3}$ of 79.792 while the IR cut-off filter 4 is made from BSC7 glass.

The effective focal length f of the lens according to this embodiment is 4.308 mm while the focal length $f_1$ of the first lens element L1 is 3.05 mm, and the focal length $f_2$ of the second lens element L2 is −9.65 mm. The distance $d_3$ from the image side 12 of the first lens element L1 to the object side of the second lens element L2 is 0.483 mm. The curvature radius of each optical surface of the second lens element L2 is −0.8028, −1.0755 mm respectively. That means these parameters satisfy the following equation (1) to equation (5):

$$\frac{f_1}{f} = 0.7079;\ \frac{f_2}{f} = -2.240;\ \frac{d_3}{f} = 0.112;$$

$$\left|\frac{R_{21} - R_{22}}{R_{21} + R_{22}}\right| = 0.145;\ \frac{H_+}{H_t} = 0.65$$

The total length of the imaging lens in this embodiment is 4.83 mm.

What is claimed is:

1. An optical imaging lens, comprising in order along an optical axis thereof from an object side to an image side:
 a first lens element with positive refractive power that is a meniscus aspherical lens having a convex surface on the object side;
 an aperture stop;
 a second lens element with negative refractive power that is a meniscus aspherical lens having a convex surface on the image side; and
 a third lens element with positive refractive power that is an aspherical lens whose center is on the optical axis, while on the lens center, a convex surface is on the object side and a concave surface is on the image side; from the center of the third lens element toward the edge thereof, the refractive power changes from positive power, through an inflection point, to negative power; wherein the optical imaging lens satisfies conditions of $$0.5 < \frac{f_1}{f} < 1.0;$$

$$-0.3 < \frac{f_2}{f} < -1.0;$$

$$0.05 < \frac{d_3}{f} < 0.2;$$

$$\left|\frac{R_{21} - R_{22}}{R_{21} + R_{22}}\right| < 0.15;$$

wherein f is effective focal length of the optical imaging lens, $f_1$ is effective focal length of the first lens element, $f_2$ is effective focal length of the second lens element, $d_3$ is distance from the image side of the first lens element to the object side of the second lens element, $R_{21}$ is radius of curvature of the object side of the second lens element and $R_{22}$ is radius of curvature of the image side of the second lens element.

2. The optical imaging lens as claimed in claim 1, wherein both the convex surface and the concave surface of the third lens element are aspherical surfaces.

3. The optical imaging lens as claimed in claim 1, wherein the inflection point of the third lens element satisfies a condition of:

$$\frac{H_+}{H_t} \geq 0.5;$$

wherein $H_+$ is the distance from the inflection point of the third lens element to the optical axis and $H_t$ is the distance from the maximum optical effective point of the third lens element to the optical axis.

4. The optical imaging lens as claimed in claim 1, wherein optical material that the first lens element is made from satisfies a condition of $$N_{d1} \geq 1.5;$$

$$v_{d1} \geq 55;$$

wherein $N_{d1}$ is the refractive index of the first lens element and $V_{d1}$ is the abbe number of the first lens element.

5. The optical imaging lens as claimed in claim 1, wherein optical material that the second lens element is made from satisfies a condition of:

$$v_{d2} \cdot N_{d2} \geq 29.5$$

wherein $N_{d2}$ is the refractive index of the second lens element and $v_{d2}$ is the abbe number of the second lens element.

6. The optical imaging lens as claimed in claim 1, wherein optical material that the third lens element is made from satisfies a condition of:

$$N_{d3} \geq 1.4$$

$$v_{d3} \geq 42$$

wherein $N_{d3}$ is the refractive index of the third lens element and $v_{d3}$ is the abbe number of the third lens element.

7. The optical imaging lens as claimed in claim 1, wherein the first lens element and the third lens element are made from glass while the second lens element is made from plastic.

8. The optical imaging lens as claimed in claim 1, wherein the first lens element, the second lens element and the third lens element are made from glass.

9. The optical imaging lens as claimed in claim 1, wherein the first lens element is made from glass while the second lens element and the third lens element are made from plastic.

10. The optical imaging lens as claimed in claim 1, wherein the first lens element and the third lens element are made from plastic while the second lens element is made from glass.

11. The optical imaging lens as claimed in claim 1, wherein the first lens element and the second lens element are made from plastic while the third lens element is made from glass.

12. The optical imaging lens as claimed in claim 1, wherein the first lens element, the second lens element and the third lens element are made from plastic.

* * * * *